Patented June 22, 1943

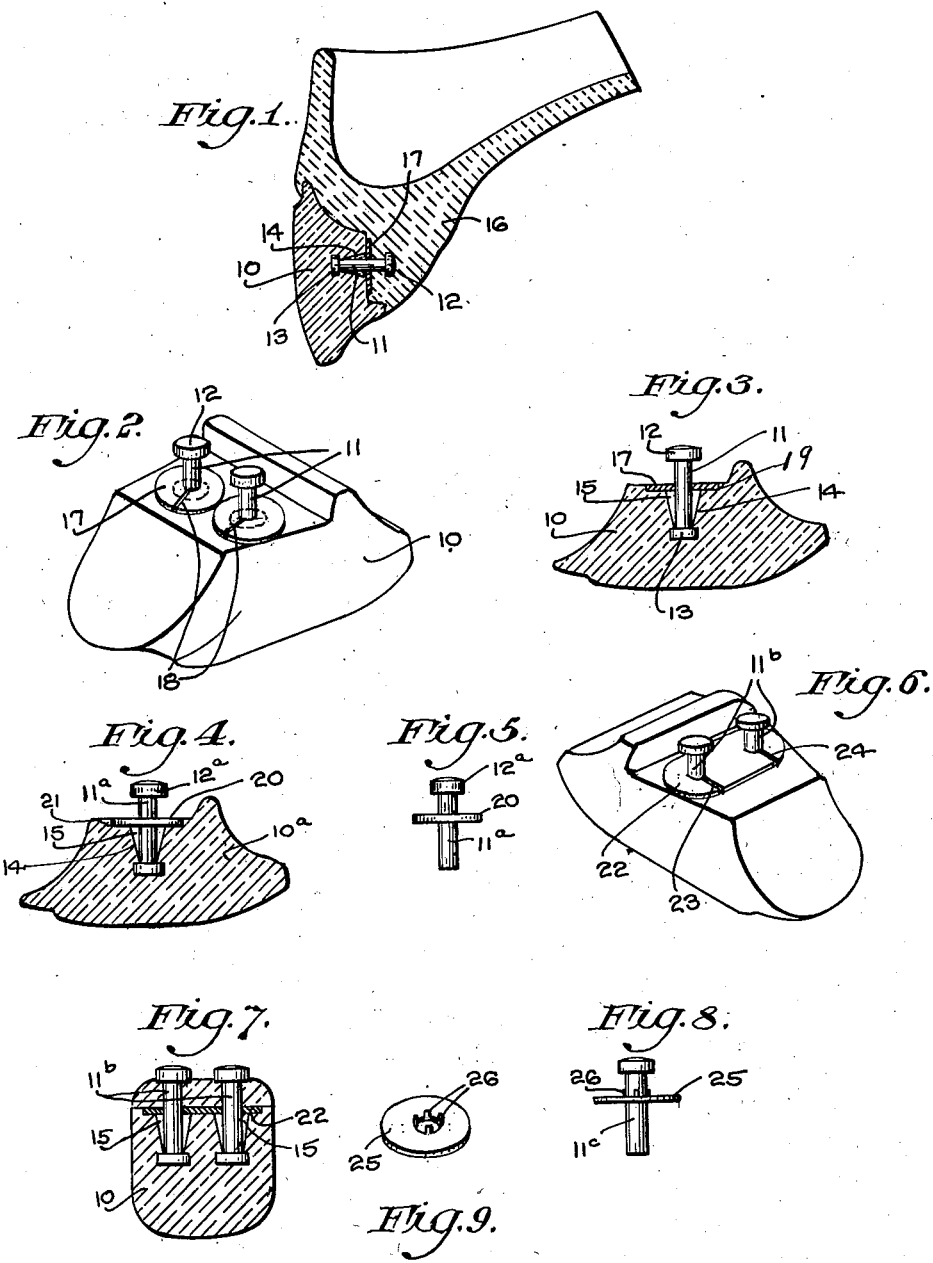

2,322,325

UNITED STATES PATENT OFFICE 2,322,325

DENTURE

Michael Russell Stein and Henry Karlin, New York, N. Y., assignors to Universal Dental Company, Philadelphia, Pa., a corporation of Pennsylvania Application December 30, 1940, Serial No. 372,318

7 Claims. (Cl. 32—10)

This invention relates generally to artificial teeth and more particularly to improvements in the construction of artificial teeth of the type employing one or two anchoring pins which project from the lingual side of the tooth body to provide means for securing the tooth to the denture plate.

For many years, it has been the practice in the manufacture of artificial tooth dentures to form the denture plate to which the artificial teeth are secured by means of the anchoring pins aforesaid of vulcanite or other such material. Also, it has been a common practice in the art to so anchor pins in the tooth body as to leave a small space between the shank of the pin and the porcelain body of the tooth in which the pin is anchored, this space being customarily provided to permit, to a limited degree, lateral adjustment of the pin. In some cases, the space surrounding that portion of the shank of the pin which is included within the porcelain body of the tooth is provided only as an incident in the manufacture of the pin type of tooth, it being understood that the customary practice in the art is to solder the inner extremity of the pin to an anchor suitably embedded in the porcelain body of the tooth.

More recently, denture plates have been formed of materials other than vulcanite, one such material which is now generally employed being methyl methacrylate resin. While this latter material has been found to be superior to vulcanite in a number of respects, nevertheless due to the fact that the coefficient of expansion of such material is greater than that of the porcelain of which the tooth body is formed, its use as a denture base material has been the cause of fracture of the teeth in the regions of their anchoring pins. In explanation of this cause of fracture, it may be stated that in mounting the artificial teeth upon the denture plate, no provision has heretofore been made to prevent the denture base material from entering into the space normally provided between the shank of the anchoring pin and the surrounding body of the porcelain tooth.

While this customary practice involved no serious difficulties in the case where the denture plate was formed of vulcanite or other such material having a coefficient of expansion less or no greater than that of the porcelain body of the tooth, I have found that when the teeth are set in a denture plate formed of methyl methacrylate resin and other such denture base materials without the provision of any means designed to prevent such material entering and becoming compacted in the annular space in the tooth surrounding the anchoring pin thereof, upon subsequent curing of such material it expands to such degree as to set up in the tooth internal stresses and strains of sufficiently high order to cause the tooth to crack in the region immediately surrounding each anchoring pin.

It is accordingly among the objects of the present invention to provide means for preventing establishment of destructive stresses and strains in the tooth body such as have been described hereinbefore, thus rendering possible the use of any suitable moldable material in the formation of a denture plate for artificial teeth.

A further object is to provide means for eliminating any possible internal stresses or strains to be set up within the body of the porcelain tooth in the region of its anchoring pin, all without changing in any material respect the construction of the tooth itself.

Other objects and advantages of the invention will be apparent more fully hereinafter, it being understood that the invention consists substantially in the combination, construction, location and relative arrangement of parts, all as will be described more fully hereinafter, as shown in the accompanying drawing and as finally pointed out in the appended claims.

In the said accompanying drawing, which is intended to be illustrative of certain preferred embodiments of the present invention:

Figure 1 is a vertical section of a denture construction in accordance with and embodying the principles of the present invention;

Figure 2 is a perspective view of an artificial tooth prepared for use in the denture of Figure 1;

Figure 3 is a longitudinal sectional view of a modified form of tooth constructed in accordance with and embodying the present invention;

Figure 4 is a longitudinal sectional view of another modified form of the tooth;

Figure 5 is a side elevational view of a form of anchoring pin for use in accordance with the present invention;

Figure 6 is a perspective view of a tooth similar to that of Figure 2 but showing a modified arrangement of the stress-eliminating means;

Figure 7 is a transverse sectional view of the tooth shown in Figure 6;

Figure 8 is a side elevational view of a modified form of anchoring pin assembly;

Figure 9 is a perspective view of the collar element shown in the assembly of Figure 8.

Referring now to the drawing and more particularly to Figures 1 and 2 thereof, it will be observed that the artificial tooth to be prepared for mounting upon the denture plate in accordance with the principles of the present invention is designated generally by the reference numeral 10 and is provided with the usual anchoring pins 11. In the form of tooth illustrated in Figures 1 and 2, two such anchoring pins are employed arranged in laterally spaced relation, it being understood, however, that the principles of the present invention are equally applicable for teeth of the type employing a single anchoring pin.

In accordance with conventional practice, these anchoring pins 11 are provided with enlarged heads 12 and are firmly anchored in the body of the tooth 10 by soldering the inner extremities thereof to suitable anchors 13 embedded in the porcelain body of the tooth during the manufacture thereof. As is illustrated most clearly in Figure 1, the lingual face of the tooth is generally provided with a tapering socket 14 embracing a substantial portion of the shank of the pin 11, thus providing an annular space 15 (Figure 3) between the shank of the anchoring pin and the body of the tooth 10. This annular space is sometimes provided only as an incident in the manufacture of the tooth, while in other cases it is deliberately formed to provide room for lateral adjustment of the anchoring pin to meet certain exigencies in the mounting of the tooth upon the denture plate. This denture plate is designated generally by the reference numeral 16 and is formed of a suitable moldable material such as vulcanite and the more recently developed methyl methacrylate resins.

In mounting the tooth 10 upon the denture 16 in accordance with conventional practice, the material of which the denture plate is formed is permitted to enter into and completely fill the annular space 15 surrounding each of the anchoring pins 11. In the case where such denture plate is formed of vulcanite, subsequent curing of the denture plate with the teeth mounted in position thereon did not have any deleterious effect upon the porcelain teeth. However, where denture plates are formed of the newly developed resins, such as methyl methacrylate resin and the like, it has been found that if such denture base material is permitted to enter and fill the annular space 15 surrounding each anchoring pin, upon subsequent curing of the base material, stresses and strains are set up in the teeth in the immediate regions of the anchoring pins to cause fracture of the teeth in such regions. While it is not certain as to just what causes this fracture to take place, it is believed to be due to the fact that the newly developed resins have a higher coefficient of expansion than vulcanite in consequence of which upon curing said material the portion thereof which is confined within the space 15 expands to such extent as to set up in the region of the anchoring pins stresses and strains which tend to fracture the body of the teeth. The present invention has as its principal object to eliminate this cause of fracture of the teeth, this objective being accomplished generally by the provision of means associated with the tooth for precluding the entry of any of the denture plate material into the space 15 which is normally provided about the shank of the anchoring pin.

Referring now again more particularly to Figures 1 and 2, it will be observed that each of the anchoring pins 11 is embraced by a flat washer 17, each of these washers being centrally apertured to snugly fit the shank of the anchoring pin 11 and being of an external diameter sufficiently great to cover completely the annular space 15 present in the body of the tooth and surrounding the shank of the pin. In the particular form of the invention as shown in Figures 1 and 2, these washers are of the split type, each being split, as at 18, to facilitate placement of the washer upon the pin in snug engagement with the shank thereof. Also, it will be observed that the split washers 17 are each disposed in flatwise contact with the lingual surface of the tooth marginally surrounding each of the anchoring pin sockets 14. By employing the split type of washer 17, they may be fitted on the headed pins of any of the conventionally made artificial teeth without any special tools and without involving any disorganization between the pins and the tooth bodies in which the pins are permanently anchored.

When a pin-type tooth equipped with a washer, such as 17, is desired to be mounted upon the denture plate 16, it is only necessary to slip the washer along the shank of the pin so that the washer lies flat against the lingual surface of the tooth. In this position, the washer serves as an effective seal to prevent entry of any of the denture base material into the space 15 surrounding the pin, the denture plate 16 being thereupon formed and cured in accordance with conventional practice to securely anchor the teeth therein as shown in Figure 1.

Figure 3 shows a slight modification from the construction shown in Figures 1 and 2 in that the body of the tooth is undercut, as at 19, in the lingual face thereof to snugly receive the washer 17, thus disposing the outer surface of the washer in a plane substantially flush with that of the lingual face of the tooth.

Figures 4 and 5 illustrate still another possible form of the invention. In this latter form, the element for effectively closing or sealing the open end of the anchoring pin socket in the tooth is formed as an integral part of the anchoring pin 11$^a$, this element being in the form of a radially extending flange 20. Preferably, this flange 20 is snugly accommodated in an undercut seat 21 therefor provided in the lingual face of the tooth 10$^a$. It will be understood, of course, that in employing the flange type of pin, as shown in Figures 4 and 5, the distance between the inner extremity of the shank and the flange permanently secured thereto must be such that when the pin is secured in position within the body of the tooth 10$^a$, the flange 20 lies flat against the lingual face of the tooth.

Figure 6 illustrates still another modified form of the invention. In this case, a single flat member 22 is employed to seal both of the laterally spaced openings present in the conventional two-pin type of tooth, this plate being split, as at 23 and 24, to facilitate assembly of the plate snugly about the shanks of the pins 11$^b$—11$^b$.

In some cases, it may be desired to fit each pin individually with a washer prior to soldering the pin to its anchor which is embedded in the tooth body. In such event, there is no necessity for employing split washers or rings, it being simply necessary to slip a centrally perforated ring onto the shank of the pin before the latter is anchored in position to the tooth. However, in order to prevent undue play or looseness between such ring and the pin during the operation of mounting a set of teeth upon a denture plate, it may be desirable to provide such ring, designated by the reference numeral 25 in Figures 8 and 9, with a plurality of circumferentially spaced upwardly presenting fingers 26 which exert a spring pressure against the shank of the pin 11c to hold the ring 25 in position against the lingual face of the tooth.

In all of the forms of the invention shown in the several figures hereinbefore described, it will be noted that means are provided for effectually precluding any of the denture base material of which the denture plate 16 is formed from entering into and filling the space in the body of the tooth immediately surrounding the shank of each anchoring pin. Thus, there is no possibility for such denture material to set up within the tooth any stresses or strains to cause fracture of the tooth body.

It will be understood, of course, that the present invention is susceptible of various changes and modifications which may be made from time to time and accordingly it is intended to claim the same broadly, as well as specifically, as indicated in the appended claims.

What is claimed as new and useful is:

1. In a denture of the character described, a denture plate, an artificial tooth mounted on said plate, said tooth being provided with a pin extending lingually therefrom and having a head adapted to be embedded in said plate the shank of said pin being disposed in a socket formed in said tooth whereby to provide an annular space surrounding said pin, and means closely embracing the shank of said pin and disposed externally of said socket for precluding entry into the said space surrounding the pin of any of the material of which said denture plate is formed.

2. In a denture of the character defined in claim 1 wherein said means is in the form of a split washer fitted over the shank of the anchoring pin.

3. In an artificial tooth, an anchoring pin projecting outwardly from one face thereof, said tooth being characterized in that it is provided with an annular space surrounding the shank of said anchoring pin, and means associated with said pin externally of said annular space to seal the outer end of the latter against the entry of any filling material therein.

4. An artificial tooth of the character defined in claim 3 wherein said means is in the form of a split washer closely fitted over the shank of said anchoring pin.

5. In an artificial tooth of the character defined in claim 3 wherein said means is in the form of a radial flange integral with the shank of said anchoring pin.

6. In an artificial tooth of the character defined in claim 3 wherein said means is in the form of a flat plate member apertured to closely fit over the shank of said anchoring pin and adapted to overlie the surface of the tooth from which said pin projects.

7. In an artificial tooth, an anchoring pin projecting outwardly from one face thereof, said tooth being characterized in that it is provided with an annular space surrounding the shank of said anchoring pin, and means closely surrounding the shank of said pin externally of the annular space in the tooth for precluding the entry of any filling material into said space.

MICHAEL RUSSELL STEIN.
HENRY KARLIN.